(12) United States Patent
Nortey et al.

(10) Patent No.: US 10,874,132 B2
(45) Date of Patent: Dec. 29, 2020

(54) FOOD PRODUCTS AND DEVICES FOR UTILIZING COCONUTS

(71) Applicant: Creamy Coconuts, LLC, Hayward, CA (US)

(72) Inventors: Kai B. Nortey, Hayward, CA (US); Ernest Nortey, Hayward, CA (US)

(73) Assignee: Creamy Coconuts, LLC, Hayward, CA (US)

( * ) Notice: Subject to any disclaimer, the term of this patent is extended or adjusted under 35 U.S.C. 154(b) by 121 days.

(21) Appl. No.: 15/856,611

(22) Filed: Dec. 28, 2017

(65) Prior Publication Data

US 2018/0184696 A1    Jul. 5, 2018

Related U.S. Application Data

(60) Provisional application No. 62/440,355, filed on Dec. 29, 2016.

(51) Int. Cl.
| | |
|---|---|
| *A23N 5/08* | (2006.01) |
| *A23N 5/03* | (2006.01) |
| *A23L 29/238* | (2016.01) |
| *A23G 9/00* | (2006.01) |
| *A23L 25/00* | (2016.01) |
| *A23L 15/00* | (2016.01) |
| *A23L 19/00* | (2016.01) |
| *A23L 27/00* | (2016.01) |
| *A23L 29/20* | (2016.01) |

(52) U.S. Cl.
CPC .............. *A23N 5/08* (2013.01); *A23G 9/00* (2013.01); *A23L 15/35* (2016.08); *A23L 25/30* (2016.08); *A23L 29/238* (2016.08); *A23N 5/03* (2013.01); *A23L 19/00* (2016.08); *A23L 27/00* (2016.08); *A23L 29/20* (2016.08); *A23V 2002/00* (2013.01)

(58) Field of Classification Search
CPC .......... A23L 19/00; A23L 29/20; A23L 27/00; A23N 5/08; A23N 5/03; A23V 2002/00; A47J 17/18; A47J 25/00
See application file for complete search history.

(56) References Cited

FOREIGN PATENT DOCUMENTS

FR         2619497 A1 *  2/1989  ............... A23N 5/03

OTHER PUBLICATIONS

Rinto, IN201304802 I4 Coconut scraper assembly is mountable on stand type food mixers, has scraper blade is mounted on die gear shaft, and plate is provided to unite gear assembly, and container holds coconut scrap (Year: 2013).*

\* cited by examiner

*Primary Examiner* — Subbalakshmi Prakash
(74) *Attorney, Agent, or Firm* — J.A. Lindeman & Co., PLLC (57) ABSTRACT

This disclosure pertains to vegan food products comprising liquid coconut material. Liquid coconut material provides an alternative to dairy and eggs normally found in ice cream. Also disclosed herein is a NSF certified device for extracting coconut meat from coconuts.

7 Claims, 6 Drawing Sheets

FOOD PRODUCTS AND DEVICES FOR UTILIZING COCONUTS

CROSS REFERENCE TO RELATED APPLICATIONS

This application claims benefit under 35 U.S.C. 119(e) to U.S. Provisional Application No. 62/440,355 filed Dec. 29, 2016, which is hereby incorporated by reference in its entirety."

TECHNICAL FIELD

This disclosure relates to the food industry. In particular, this disclosure relates to food products, food processing methods, and devices for processing food.

BACKGROUND

In recent years many artisanal food products have entered the consumer market. Crafters of artisanal food products aim to deliver a quality, handmade product with high quality ingredients, attention to detail, lack of preservatives and additives, etc.

There are many subpar products in a grocery market made with processed ingredients and preservatives. As a result, many chefs, homemakers, entrepreneurs, etc., have started to produce high quality food products.

One specific need is fulfilling certain dietary needs that most large-scale manufacturers do not produce. One example is offering vegan products. A vegan diet is free of animals and animal byproducts. Dairy, e.g., milk, butter, cream, etc., eggs, and other animal products are widely used for number of reasons, e.g., gelatin for structure, various animal fats for texture, various dyes and powders harvested from bugs, etc.

Ice cream is an example of how dairy and eggs plays an important role in the ice cream making process. Ice cream makers use cream and milk to provide fat, water, and sugar for a great tasting ice cream and for producing a smooth texture. Eggs are also used to provide fat but also comprise natural emulsifiers to help achieve a smooth texture. Eggs, specifically egg yolks, help provide stability and helps increase shelf life.

Vegans, for health or ethical reasons, cannot consume most manufactured ice creams because of the dairy and eggs. Milk and dairy products also contain lactose, a milk sugar that makes it difficult for people's bodies to process. Most commercial ice creams are made with preservatives and additives as well.

Coconut are a viable dairy alternative. Coconuts can be used to make coconut milk and/or coconut cream. Both coconut milk and cream are made through similar processes. Coconut flesh or meat is shredded, grated, ground up, etc., and then water is used for extracting oils and other compounds from the ground coconut producing a thick, milk like liquid. The thickness of the milk determined by how much oil is extracted. The resulting coconut milk and cream can be used in place of dairy and sometimes even eggs to produce an ice cream.

A drawback is that coconut milk and cream still contain a large amount of water, which makes making a smooth, creamy ice cream difficult. Excess water in an ice cream mix increases the amount of large ice crystals produced during the churning process producing an icy ice cream. Also, most commercially available coconut milk and cream are heavily processed. Often containing sulfur dioxide to prevent browning, added sugar, and a number of other preservatives as well. Thus, fresh coconut milk or cream is ideal.

There exists a need for food products free of any animal-based and animal-derived products. There exists a need for a vegan ice cream. In particular, a vegan ice cream comprising coconut. There exists a need for food products capable of having multiple flavors. There exists a need for vegan ice cream products comprising little to no sulfur dioxide. There exists a need for a coconut based ice cream comprising a higher fat to water ratio. There exists a need for an unpasteurized vegan ice cream. There exists a need for new durable devices capable of efficiently extracting coconut meat from a coconut in a sanitary manner.

DETAILED DESCRIPTION

Disclosed herein is a new food product free of animal and animal based products. In one embodiment, the food products disclosed herein comprise liquid coconut material. In one embodiment, the liquid coconut material is unpasteurized. In one embodiment, the food products disclosed herein comprise unpasteurized coconut cream.

Disclosed herein is a new food product comprising various flavoring agents. In one embodiment, the flavoring agent is a fruit. In one embodiment, the flavoring agent is a spice. In one embodiment, the flavoring agent is chocolate. In one embodiment, the flavoring agent is coffee. In one embodiment, the food products disclosed herein comprise two or more flavoring agents, e.g., chocolate and coffee, two or more fruits, a fruit and a spice, etc.

Disclosed herein is a new device for shredding coconut meat. In one embodiment, the devices disclosed herein are powered by a drill. In one embodiment, the devices disclosed herein are composed of a single metal unit with no additional welded or attached parts. In one embodiment, the devices disclosed herein comprise a plurality of teeth for shredding coconut into thin strips. In one embodiment, the devices disclosed herein are composed of stainless steel. In one embodiment, the stainless steel comprises a minimum of 16% chromium by mass percent. In one embodiment, the stainless steel is series 304 stainless steel.

Disclosed herein are new methods of extracting liquid coconut material from a coconut. In one embodiment, the methods disclosed herein comprise cold pressing coconuts. In one embodiment, the methods disclosed herein comprise not adding additional water.

Disclosed herein is a food product produced by:
Separating coconut meat from a coconut;
Heating the coconut meat;
Pressing the coconut meat to separate a liquid coconut material from the coconut meat; and Collecting the liquid coconut material.

Disclosed herein is a food product produced by:

Separating coconut meat from a coconut;

Heating the coconut meat;

Pressing the coconut meat to separate a liquid coconut material from the coconut meat; and Collecting the liquid coconut material, wherein the food product is substantially free of soy and soy derivatives.

As used herein, the term "coconut" refers to an organism and/or any part of the organism grown from a coconut tree. In one embodiment, a coconut is an organism of the family Arecaceae. In one embodiment, a coconut is an organism of the genus Cocos. In one embodiment, the term "coconut" refers to the meat or fruit of a coconut. In one embodiment, the term "coconut" refers to the coconut palm. In one embodiment, the term "coconut" refers to the coconut seed. In one embodiment, a coconut is a mature coconut.

As used herein, the term "mature coconut" refers to a coconut with a brown, hairy exterior. By contrast, a young coconut has a white shell or green husk. Common characteristics of a mature coconut are having less water, having a firm flesh, and a thicker flesh. In one embodiment, a young coconut turns into a mature coconut by aging the young coconut, e.g., leaving a young coconut on a tree.

As used herein, the term "coconut meat" refers to the interior flesh of a coconut. In one embodiment, coconut meat from a mature coconut is firm, white, and fibrous. In one embodiment, coconut meat from a young coconut is white and gelatinous. Within the culinary field, the meat or flesh of a fruit is considered the edible part of a fruit but many times the entire fruit is consumed.

As used herein, the term "fruit" refers to a seed-bearing structure found in flowering plants. In one embodiment, fruit is formed from the ovary after flowering. Within the context of this disclosure, the term "fruit" refers to generally accepted term for a fleshy, seed structure of a plant normally consumed raw. In one embodiment, a fruit has a sweet flavor when consumed. In one embodiment, a fruit has a sour flavor when consumed. In one embodiment, a fruit has a tart flavor when consumed. Examples of fruit include, but are not limited to, apples, bananas, oranges, grapes, plums, limes, lemons, pineapples, strawberries, blueberries, raspberries, pears, peaches, mangoes, coconuts, etc.

As used herein, the term "separating coconut meat from a coconut" refers to removing the interior flesh of a coconut from the hull/shell/exterior of the coconut. In one embodiment, separating coconut meat from a coconut comprises using a hook to pry the meat from the shell of a coconut in a single piece or several large pieces. In one embodiment, separating coconut meat from a coconut comprises grinding the coconut meat away from the coconut shell. In one embodiment, separating coconut meat from a coconut comprises cracking a whole coconut into smaller pieces and feeding the pieces through a grinder with water passing through the ground up coconut.

In one embodiment, the food products produced by this disclosure comprise cracking a coconut open. In one embodiment, a coconut is cracked along the equator of the coconut producing two separate halves. In one embodiment, a coconut is cracked into many smaller pieces. In one embodiment, a hammer and chisel is used to crack a coconut open. In one embodiment, a cleaver (for example the back of a cleaver) is used to crack a coconut open. In one embodiment, a saw is used to crack a coconut open.

In one embodiment, a food product produced by this disclosure comprises shredding coconut meat.

As used herein, the term "shredding coconut meat" refers to tearing, cutting, and/or grating coconut meat into smaller pieces, chunks, and/or strips. In one embodiment, shredding coconut flesh comprises tearing the coconut flesh into small strips. In one embodiment, shredding coconut meat comprises grinding coconut, e.g., grinding with a toothed scraper. In one embodiment, a toothed scraper tears out pieces of coconut meat from a coconut. In one embodiment, a toothed scraper comprises "teeth" positioned at an angle allowing the toothed scraper to dig into the coconut meat and rip out the coconut meat from the shell of a coconut.

As used herein, the term "heating coconut meat" refers to increasing the temperature of coconut meat above the initial temperature of the coconut meat. Within the context of this disclosure, heating coconut meat comprises any means known, e.g., using a fire, using an electric stove, using an oven, using chemical reactions, etc.

In one embodiment, the coconut meat is heated between 50 to 100° F. In one embodiment, the coconut meat is heated between 60 to 90° F. In one embodiment, the coconut meat is heated between 70 to 80° F. In one embodiment, the coconut meat is heated between 65 to 75° F. In one embodiment, the coconut meat is heated between 75 to 85° F. In one embodiment, the coconut meat is heated between 85 to 95° F. In one embodiment, heating coconut meat comprises utilizing a double boiler.

As used herein, the term "double boiler" refers to a first container housed within a second container, wherein the second container contains water and the water is heated is warm the first container. In one embodiment, a double boiler is used for slow and/or gentle heating. In one embodiment, steam from water allows for the gentle heating and the proximity of the second container to the water affects the heating process.

In one embodiment, a double boiler is used to sufficiently heat the coconut meat between 60 to 100° F. In one embodiment, the water within a double boiler is heated between 160 to 210° F. In one embodiment, the water within a double boiler is heated between 170 to 200° F. In one embodiment, the water within a double boiler is heated between 180 to 190° F.

In one embodiment, heating coconut meat is accomplished via convection.

As used herein, the term "convection" refers to the transfer of heat between physical systems by the movement of molecules within liquids or gases. In one embodiment, heating coconut meat is accomplished by circulating hot air around the coconut meat. In one embodiment, convection is accomplished with an oven.

In one embodiment, heating coconut meat is accomplished via conduction.

As used herein, the term "conduction" refers to the transfer of heat between physical systems through the collisions of particles and movement of electrons. In one embodiment, heating coconut meat comprises heating a metal container and placing coconut meat in the container.

In one embodiment, heating coconut meat is accomplished via radiation.

As used herein, the term "radiation" refers to the use of energy emitted in the form of waves and/or particles. In one embodiment, heating coconut meat comprises placing coconut meat in a machine capable of producing microwaves. In one embodiment, heating coconut meat comprises placing coconut meat under light.

As used herein, the term "pressing the coconut meat" refers to applying force to coconut flesh. Within the context of this disclosure, pressing coconut meat is accomplished by any means known in the art. In one embodiment, pressing coconut meat comprises squeezing coconut meat with a person's hands. In one embodiment, pressing coconut meat comprises placing coconut meat in a cloth and wringing/squeezing the cloth. In one embodiment, pressing coconut meat comprises placing mass on top of coconut meat. In one embodiment, pressing coconut meat comprises placing coconut meat in a vacuum and removing air.

In one embodiment, shredded coconut meat is placed in pressing bags.

As used herein, the term "pressing bag" refers to a container composed of flexible material capable of withstanding force applied by pressing. In one embodiment, pressing bags comprises pores and/or perforations. Pressing bags with perforations are useful for separating liquids from solids. Controlling the number and size of the perforations allows one to control the rate at which a liquid leaves the pressing bags and allows one to control whether any particulates leave the pressing bag. Different sizes of perforations offer different benefits based on the desired final products. Smaller perforations allow the collected liquid to contain little to no particulates while larger perforations will allow larger particles of coconut to pass through when pressed, resulting in more solids in the collected liquid. In one embodiment, a sieve size of 1 mm (correlating to No. 18 United States mesh) is used. In one embodiment, a sieve size of 8 mm (correlating to 5/16 in. size) is used.

In one embodiment, a pressing bag is composed of a synthetic polymer or plastic, such as nylon. In one embodiment, a pressing bag is composed of cloth. In one embodiment, a pressing bag is composed of food grade plastic. In one embodiment, a pressing bag is composed of silicon. In one embodiment, a pressing bag is composed of a polyester blend.

In one embodiment, a hydraulic press applies force to a pressed bag. Within the context of this disclosure, a "hydraulic press" refers to any machine comprising a hydraulic cylinder and generating compressive force on a substance.

In one embodiment, a hydraulic press applies between 10 to 40,000 lbs. of force. In one embodiment, a hydraulic press applies between 100 to 35,000 lbs. of force. In one embodiment, a hydraulic press applies between 500 to 30,000 lbs. of force. In one embodiment, a hydraulic press applies between 1,000 to 25,000 lbs. of force. In one embodiment, a hydraulic press applies between 5,000 to 20,000 lbs. of force. In one embodiment, a hydraulic press applies between 10,000 to 15,000 lbs. of force. In one embodiment, coconut meat is pressed at an ambient temperature.

In one embodiment, pressing coconut meat occurs during temperatures 0 to 100° F. above ambient temperature.

In one embodiment, pressing coconut meat occurs during temperatures 5 to 95° F. above ambient temperature.

In one embodiment, pressing coconut meat occurs during temperatures 10 to 90° F. above ambient temperature.

In one embodiment, pressing comprises 15 to 85° F. above ambient temperature.

In one embodiment, pressing coconut meat occurs with temperatures 20 to 70° F. above ambient temperature.

In one embodiment, pressing coconut meat occurs with temperatures 25 to 65° F. above ambient temperature.

In one embodiment, pressing coconut meat occurs with temperatures 30 to 60° F. above ambient temperature.

In one embodiment, pressing coconut meat occurs with temperatures 35 to 55° F. above ambient temperature.

In one embodiment, pressing coconut meat occurs with temperatures 40 to 50° F. above ambient temperature.

As used herein, the term "liquid coconut material" refers to a fluid expelled when pressing a coconut and/or coconut meat. Within the context of this disclosure, liquid coconut material may comprise oil, coconut milk, coconut cream, water, sugars, elements, and various other chemical compounds as well as any combination thereof. In one embodiment, liquid coconut material refers to coconut cream. In one embodiment, liquid coconut material refers to coconut oil. In one embodiment, liquid coconut material is coconut oil when the coconut oil is a solid state at temperatures below 70° F. In one embodiment, liquid coconut material refers to water from a mature coconut. In one embodiment, liquid coconut material refers to coconut water in a solid state, e.g., frozen. In one embodiment, liquid coconut material refers to coconut cream and coconut oil. In one embodiment, liquid coconut material refers to coconut cream having a higher viscosity with a semi-firm texture. In one embodiment, liquid coconut material comprises valproic acid. In one embodiment, liquid coconut material comprises lauric acid. In one embodiment, liquid coconut material comprises an antimicrobial agent.

In one embodiment, the term "coconut cream" refers to thickened coconut milk. Within the culinary field, the distinction between coconut milk and coconut cream is that coconut cream comprises 25% fat by mass percent.

In one embodiment, liquid coconut material comprises between 5-90% fat. In one embodiment, liquid coconut material comprises between 10-85% fat. In one embodiment, liquid coconut material comprises between 15-80% fat. In one embodiment, liquid coconut material comprises between 20-75% fat. In one embodiment, liquid coconut material comprises between 30-70% fat. In one embodiment, liquid coconut material comprises between 35-65% fat. In one embodiment, liquid coconut material comprises between 40-60% fat. In one embodiment, liquid coconut material comprises between 45-55% fat.

In one embodiment, the food products disclosed herein comprise between 10 to 80% fat by mass.

In one embodiment, the food products disclosed herein comprise between 20 to 75% fat by mass.

In one embodiment, the food products disclosed herein comprise between 30 to 70% fat by mass.

In one embodiment, the food products disclosed herein comprise between 40 to 65% fat by mass.

In one embodiment, the food products disclosed herein comprise between 50 to 60% fat by mass.

As used herein, the term "separate a liquid coconut material" refers to splitting, extracting, or dividing a fluid material from the solid material of a coconut. In one embodiment, a liquid coconut material comprises some solid material. In one embodiment, to separate a liquid coconut material from coconut meat, the coconut meat is heated to break down cell walls. In one embodiment, to separate a liquid coconut material from coconut meat, the coconut meat is heated to turn chemical compounds within the coconut from a solid phase to a liquid phase.

As used herein, the term "collecting the liquid coconut material" refers to gathering the fluid expelled when pressing a coconut or coconut meat. In one embodiment, collecting liquid coconut material comprises placing a container under a hydraulic press, pressing a porous bag of coconut meat with the hydraulic press, and allowing liquid coconut material to flow into the container under the force of gravity. In one embodiment, collecting liquid coconut material comprises squeezing coconut meat while the coconut meat is suspended over a container. In one embodiment, collecting liquid coconut material comprises pressing coconut meat through a sieve over a container.

Coconuts are noted for containing liquid within the hollow shell of the coconut. Often referred to as "coconut water". In one embodiment, the food products disclosed herein do not comprise coconut water. Making ice cream comprises churning an ice cream at cold temperatures for achieving a smooth and pleasing texture by forming as little ice crystals as possible. Excess water results in an icy texture because there is a higher chance of large water crystals forming. Conversely, not having enough water results in a thicker and unpleasant mouth feel.

In one embodiment, a liquid coconut material has a higher fat to water ratio than desired for ice cream making. In such cases, water is added to the liquid coconut material to achieve a more desirable proportion of fat to water.

In one embodiment, the percentage of water in the liquid coconut material is measured calculated by mass percent, according to the following formula:

mass of water÷(mass of liquid coconut material+ mass of water)×100%.

For example, if 10 g of water is added to 40 g of liquid coconut material, the resulting mass percent of water is calculated by the following:

10 g÷(10 g+40 g)×100%=20%

In one embodiment, water is added to the coconut material such that the mass percent of the resulting mixture is 1-25%. In one embodiment, water is added to the coconut material such that the mass percent of the resulting mixture is 5-20%. In one embodiment, water is added to the coconut material such that the mass percent of the resulting mixture is 10-15%. In one embodiment, water is added to the coconut material such that the mass percent of the resulting mixture is 12-14%.

In one embodiment, a food product produced by this disclosure comprises adding a thickening agent to the liquid coconut material.

As used herein, the term "thickening agent" refers to a compound increasing the viscosity of a substance. Examples of thickening agents include, but are not limited to, guar gum, agar, flour, cornstarch, potato starch, xanthan gum, gelatin, carrageenan, arabic gum, carboxylmethyl cellulose, konjac gum, kudzu root starch, arrowroot, locust bean gum, pectin, and alginic acid. In one embodiment, a thickening agent is also a gelling agent.

In one embodiment, a thickening agent is guar gum.

In one embodiment, 0.2-0.6 g of guar gum is added to 400-500 g of liquid coconut material and 60-70 g of water.

In one embodiment, 0.2-0.6 g of guar gum is added to 400-500 g of liquid coconut material and 170-180 g of water.

In one embodiment, 0.2-0.6 g of guar gum is added to 300-400 g of liquid coconut material and 60-70 g of water.

In one embodiment, 0.2-0.6 g of guar gum is added to 300-400 g of liquid coconut material and 60-70 g of water.

In one embodiment, 0.2-0.6 g of guar gum is added to 400-500 g of liquid coconut material and 60-70 g of water.

In one embodiment, 0.2-0.6 g of guar gum is added to 300-400 g of liquid coconut material and 25-35 g of water.

In one embodiment, 0.3-0.7 g of guar gum is added to 800-1,000 g of liquid coconut material and 525-550 g of water.

In one embodiment, the ratios disclosed herein are scaled up.

In one embodiment, the ratios disclosed herein are scaled down.

As used herein, the term "scaled up" refers to increasing a ratio of ingredients. In one embodiment, the ratios disclosed herein are doubled. In one embodiment, the ratios disclosed herein are tripled. In one embodiment, the ratios disclosed herein are quadrupled. In one embodiment, the ratios disclosed herein are multiplied by ten.

As used herein, the term "scaled down" refers to decreasing a given ratio of ingredients. In one embodiment, the ratios disclosed herein are halved. In one embodiment, the ratios disclosed herein are decreased by a third. In one embodiment, the ratios disclosed herein are decreased by a fourth.

It is understood in the culinary arts, that many different measurements may be used to determine the amount of ingredients. In one embodiment, mass is measured by grams. In one embodiment, weight is measured by ounces and pounds. In one embodiment, volume is measured by fluid ounces. In one embodiment, volume is measured by United States standard cups.

In one embodiment, a food product produced by this disclosure comprises adding a sweetener.

As used herein, the term "sweetener" refers to a compound acting on the sweet taste buds of a tongue. Within the context of this disclosure, a sweetener comprises a natural sweetener, an artificial sweetener, or a combination of the two. Examples of sweeteners include, but are not limited to, honey, sugar, agave, stevia, sorbitol, sucrose, fructose, corn syrup, rice syrup, maple syrup, molasses, golden syrup, xylitol, erythritol, monk fruit extract, coconut sugar, date syrup, date sugar, fruit, and/or any derivatives, byproducts, or mixtures thereof.

In one embodiment, the sweetener is agave.

In one embodiment, 160-280 g of agave is added to 200-700 g of liquid coconut material.

In one embodiment, 180-260 g of agave is added to 300-600 g of liquid coconut material.

In one embodiment, 200-240 g of agave is added to 400-500 g of liquid coconut material.

In one embodiment, the food products disclosed herein comprises adding a flavoring agent.

As used herein, the term "flavoring agent" refers to a compound imparting a taste and/or aroma when added to another substance. Within the context of this disclosure, a flavoring agent is a natural flavoring agent, an artificial flavoring agent, or a combination of the two. In one embodiment, a natural flavoring agent refers to a food or food byproduct. Examples of natural flavoring agents include, but are not limited to, fruits, spices, chocolate, coffee, vanilla, extracts, essential oils, natural sweeteners, vegetables, etc. In one embodiment, an artificial flavoring agent refers to a chemical composition structurally similar to the chemical structure of a natural flavoring agent. Examples of artificial flavoring agents include, but not are limited to, compositions comprising ethyl maltol, methyl salicylate, ethyl vanillin, allyl hexanoate, ethyl decadienoate, limonene, methyl anthranilate, ethyl propionate, cinnamaldehyde, benzaldehyde, isoamyl acetate, diacetyl, acetyl propionyl, and acetoin.

In one embodiment, the flavoring agent is vanilla, e.g., vanilla extract, a vanilla bean, a vanilla seed, etc.

In one embodiment, 1-25 g of vanilla beans is added to 400-500 g of liquid coconut material.

In one embodiment, 5-20 g of vanilla beans is added to 400-500 g of liquid coconut material.

In one embodiment, 10-15 g of vanilla beans is added to 400-500 g of liquid coconut material.

In one embodiment, vanilla bean extract is added.

In one embodiment, 0.5-25 g of vanilla bean extract is added to 400-500 g of liquid coconut material.

In one embodiment, 1-20 g of vanilla bean extract is added to 400-500 g of liquid coconut material.

In one embodiment, 1.5-15 g of vanilla bean extract is added to 400-500 g of liquid coconut material.

In one embodiment, 2-10 g of vanilla bean extract is added to 400-500 g of liquid coconut material.

In one embodiment, the flavoring agent is chocolate. In one embodiment, chocolate comprises 99% cocoa by mass percent.

In one embodiment, 10-400 g of chocolate is added to 400-500 of liquid coconut material.

In one embodiment, 30-360 g of chocolate is added to 400-500 of liquid coconut material.

In one embodiment, 60-320 g of chocolate is added to 400-500 of liquid coconut material.

In one embodiment, 90-280 g of chocolate is added to 400-500 of liquid coconut material.

In one embodiment, 120-240 g of chocolate is added to 400-500 of liquid coconut material.

In one embodiment, 150-200 g of chocolate is added to 400-500 of liquid coconut material.

In one embodiment, the flavoring agent is espresso, e.g., espresso beans, espresso powder, an espresso drink, etc.

In one embodiment, 40-120 g of an espresso drink is added to 400-500 g of liquid coconut material.

In one embodiment, 50-110 g of an espresso drink is added to 400-500 g of liquid coconut material.

In one embodiment, 60-100 g of an espresso drink is added to 400-500 g of liquid coconut material.

In one embodiment, 70-90 g of an espresso drink is added to 400-500 g of liquid coconut material.

In one embodiment, the flavoring agent is orange, e.g., the zest of an orange, orange juice, orange concentrate, orange fruit, orange extract, etc.

In one embodiment, 1-25 g of orange oil is added to 400-500 g of liquid coconut material.

In one embodiment, 2-22.5 g of orange oil is added to 400-500 g of liquid coconut material.

In one embodiment, 3-20 g of orange oil is added to 400-500 g of liquid coconut material.

In one embodiment, 4-17.5 g of orange oil is added to 400-500 g of liquid coconut material.

In one embodiment, 5-15 g of orange oil is added to 400-500 g of liquid coconut material.

In one embodiment, 6-12.5 g of orange oil is added to 400-500 g of liquid coconut material.

In one embodiment, 7-10 g of orange oil is added to 400-500 g of liquid coconut material.

In one embodiment, 1 to 20 g of orange is added to 400-500 g of liquid coconut material.

In one embodiment, 2 to 18 g of orange is added to 400-500 g of liquid coconut material.

In one embodiment, 4 to 16 g of orange is added to 400-500 g of liquid coconut material.

In one embodiment, 6 to 14 g of orange is added to 400-500 g of liquid coconut material.

In one embodiment, 8 to 12 g of orange is added to 400-500 g of liquid coconut material.

In one embodiment, the flavoring agent is lime, e.g., the zest of a lime, lime juice, lime concentrate, lime fruit, lime extract, etc.

In one embodiment, 1-25 g of lime oil is added to 400-500 g of liquid coconut material.

In one embodiment, 2-22.5 g of lime oil is added to 400-500 g of liquid coconut material.

In one embodiment, 3-20 g of lime oil is added to 400-500 g of liquid coconut material.

In one embodiment, 4-17.5 g of lime oil is added to 400-500 g of liquid coconut material.

In one embodiment, 5-15 g of lime oil is added to 400-500 g of liquid coconut material.

In one embodiment, 6-12.5 g of lime oil is added to 400-500 g of liquid coconut material.

In one embodiment, 7-10 g of lime oil is added to 400-500 g of liquid coconut material.

In one embodiment, 1 to 20 g of lime is added to 400-500 g of liquid coconut material.

In one embodiment, 2 to 18 g of lime is added to 400-500 g of liquid coconut material.

In one embodiment, 4 to 16 g of lime is added to 400-500 g of liquid coconut material.

In one embodiment, 6 to 14 g of lime is added to 400-500 g of liquid coconut material.

In one embodiment, 8 to 12 g of lime is added to 400-500 g of liquid coconut material.

In one embodiment, the flavoring agent is peppermint, e.g., peppermint extract, mint leaves, menthol, etc.

In one embodiment, 1-25 g of peppermint oil is added to 400-500 g of liquid coconut material.

In one embodiment, 2-22.5 g of peppermint oil is added to 400-500 g of liquid coconut material.

In one embodiment, 4-20 g of peppermint oil is added to 400-500 g of liquid coconut material.

In one embodiment, 6-17.5 g of peppermint oil is added to 400-500 g of liquid coconut material.

In one embodiment, 8-15 g of peppermint oil is added to 400-500 g of liquid coconut material.

In one embodiment, 10-12.5 g of peppermint oil is added to 400-500 g of liquid coconut material.

In one embodiment, the flavoring agent is pineapple, e.g., pineapple fruit, pineapple extract, pineapple juice, etc.

In one embodiment, 100-2,400 g of pineapple juice is added to 400-500 g of liquid coconut material.

In one embodiment, 300-2,000 g of pineapple juice is added to 400-500 g of liquid coconut material.

In one embodiment, 500-1,600 g of pineapple juice is added to 400-500 g of liquid coconut material.

In one embodiment, 700-1,200 g of pineapple juice is added to 400-500 g of liquid coconut material.

In one embodiment, the flavoring agent is ginger, e.g., candied ginger, ginger peel, dried ginger, ginger powder, grated ginger, etc.

In one embodiment, 1-20 grams of grated ginger is added to 400-500 g of liquid coconut material.

In one embodiment, 2-18 grams of grated ginger is added to 400-500 g of liquid coconut material.

In one embodiment, 4-16 grams of grated ginger is added to 400-500 g of liquid coconut material.

In one embodiment, 6-14 grams of grated ginger is added to 400-500 g of liquid coconut material.

In one embodiment, 8-12 grams of grated ginger is added to 400-500 g of liquid coconut material.

In one embodiment, the food products disclosed herein comprise blending the liquid coconut material, the thickening agent, the sweetener, and the flavoring agent into a mixture of ingredients.

As used herein, the term "blending the liquid coconut material, the thickening agent, the sweetener, and the flavoring agent" refers to mixing, emulsifying, and/or combining the liquid coconut material, the thickening agent, the sweetener, and the flavoring agent into a homogenous mixture. In one embodiment, blending the liquid coconut material, the thickening agent, the sweetener, and the flavoring agent comprises incorporating air. In one embodiment, blending the liquid coconut material, the thickening agent, the sweetener, and the flavoring agent comprises creating a smooth mixture. In one embodiment, blending the liquid coconut material, the thickening agent, the sweetener, and the flavoring agent comprises creating a textured substance, e.g., particulates of food products, e.g., chocolate chunks, fruit pieces, etc.

In one embodiment, a blender is used for blending the liquid coconut material, the thickening agent, the sweetener, and the flavoring agent. Within the context of this disclosure, a blender refers to a machine with a container comprising a blade attached wherein ingredients are placed and the blade is spun. A blender has various controls for speed and time. Within the culinary field there is no set standard for what "high" and "low" settings are.

Speed and time of blending affects the thickness, integration, temperature, taste, etc., of the resulting mixture. In one embodiment, a blender incorporates air creating a lighter texture in the mixture. In one embodiment, the speed of a blade causes friction raising the temperature of the mixture. In one embodiment, the time and speed dissipates heat decreasing the temperature of the mixture.

As used herein, the term "mixture of ingredients" refers to a homogeneous substance from a combination of two or more compounds disclosed in this disclosure. In one embodiment, a mixture of ingredients comprises liquid coconut material and a thickening agent. In one embodiment, a mixture of ingredients comprises liquid coconut material and a sweetener. In one embodiment, a mixture of ingredients comprises a sweetener and a flavoring agent. In one embodiment, a mixture of ingredients comprises liquid coconut material, thickening agent, sweetener, and flavoring agent In one embodiment, a mixture of ingredients is blended at a high speed between 1-200 seconds.

In one embodiment, a mixture of ingredients is blended at a high speed between 10-180 seconds.

In one embodiment, a mixture of ingredients is blended at a high speed between 20-160 seconds.

In one embodiment, a mixture of ingredients is blended at a high speed between 30-140 seconds.

In one embodiment, a mixture of ingredients is blended at a high speed between 40-120 seconds.

In one embodiment, a mixture of ingredients is blended at a high speed between 50-100 seconds.

In one embodiment, a mixture of ingredients is blended at a high speed between 60-80 seconds.

In one embodiment, a mixture of ingredients is blended until the temperature of the mixture is about 60 to 120° F.

In one embodiment, a mixture of ingredients is blended until the temperature of the mixture is about 65 to 115° F.

In one embodiment, a mixture of ingredients is blended until the temperature of the mixture is about 70 to 110° F.

In one embodiment, a mixture of ingredients is blended until the temperature of the mixture is about 75 to 105° F.

In one embodiment, a mixture of ingredients is blended until the temperature of the mixture is about 80 to 100° F.

In one embodiment, a mixture of ingredients is blended until the temperature of the mixture is about 85 to 90° F.

In one embodiment, the food products produced by this disclosure comprise cooling a mixture of ingredients.

In one embodiment, the food products produced by this disclosure comprise cooling a mixture of ingredients to about 20 to 80° F.

In one embodiment, the food products produced by this disclosure comprise cooling a mixture of ingredients to about 25 to 75° F.

In one embodiment, the food products produced by this disclosure comprise cooling a mixture of ingredients to about 30 to 70° F.

In one embodiment, the food products produced by this disclosure comprise cooling a mixture of ingredients to about 35 to 65° F.

In one embodiment, the food products produced by this disclosure comprise cooling a mixture of ingredients to about 40 to 60° F.

In one embodiment, the food products produced by this disclosure comprise cooling a mixture of ingredients to about 45 to 55° F.

As used herein, the term "cooling the mixture of ingredients" refers to decreasing the temperature of a mixture of ingredients below the initial temperature of the mixture of ingredients. Examples of cooling a mixture of ingredients include, but are not limited to, placing a mixture of ingredients in a bowl over ice, placing a mixture of ingredients in a refrigerator, placing a mixture of ingredients in a freezer, adding ice to a mixture of ingredients, adding dry ice to a mixture of ingredients, adding liquid nitrogen to a mixture of ingredients, or leaving at a mixture of ingredients at ambient temperatures below the temperature of the mixture of ingredients.

In one embodiment, the food products produced by this disclosure comprise agitating a mixture of ingredients at temperatures of about −25 to about 10° F.

In one embodiment, the food products produced by this disclosure comprise agitating a mixture of ingredients at temperatures of about −20 to about 5° F.

In one embodiment, the food products produced by this disclosure comprise agitating a mixture of ingredients at temperatures of about −15 to about 0° F.

In one embodiment, the food products produced by this disclosure comprise agitating a mixture of ingredients at temperatures of about −10 to about −5° F.

As used herein, the term "agitating the mixture of ingredients" refers to adding energy to a mixture of ingredients causing the particles of the mixture of ingredients to move. In one embodiment, agitating comprises stirring, mixing, beating, shaking, churning, etc. In one embodiment, a mixture of ingredients is stirred at a constant speed for a period of time. In one embodiment, a mixture of ingredients is shaken repeatedly in a container. In one embodiment, a mixture of ingredients is placed in a freezer and mixed periodically, e.g., every 10 minutes, every 15 minutes, etc.

In one embodiment, a mixture of ingredients is placed in an ice cream machine.

As used herein, the term "ice cream machine" refers to a device or apparatus for making cold food products. In one embodiment, an ice cream machine is a device wherein a paddle continuously agitates the food product while in a chilled container. In one embodiment, an ice cream machine is a mixer agitating the food product while liquid nitrogen is poured into the food product. In one embodiment, an ice cream machine is device wherein a blade breaks down larger ice crystals into smaller ice crystals.

In one embodiment, the food products produced by this disclosure comprise cooling a mixture of ingredients at a temperature of about −20 to about −5° F. for between 1-24 hours.

In one embodiment, the food products produced by this disclosure comprise cooling a mixture of ingredients at a temperature of about −20 to about −5° F. for between 4-18 hours.

In one embodiment, the food products produced by this disclosure comprise cooling a mixture of ingredients at a temperature of about −20 to about −5° F. for between 6-12 hours.

In one embodiment, the food products disclosed herein are substantially free from sulfur dioxide and derivatives thereof.

As used herein, the term "sulfur dioxide" refers to a compound of the following structural formula:

Sulfur dioxide is a commonly used food additive to prevent the browning of canned foods. Sodium metabisulfite ($Na_2S_2O_5$) is a common compound used. Adding sulfur dioxide is a common industry practice when pasteurizing coconut cream and other canned food products. Within the context of this disclosure, sulfur dioxide includes any derivatives of sulfur dioxide.

As used herein, the term "substantially free" refers to a nominal amount of a compound or compounds within a mixture. Within the context of this disclosure, it is understood that substances deemed substantially free may still be present in a mixture but register in amounts so low that it would have virtually no effect within the mixture or when consumed. It is understood that sulfur dioxide is a natural occurring compound and small concentrations may be detected within the atmosphere. In one embodiment, the phrase substantially free from sulfur dioxide means that no sulfur dioxide is added, for example in an embodiment where coconut cream is not pasteurized and not canned and has no sulfur dioxide added to it.

In one embodiment, substantially free comprises a substance having 0 to 0.1% by mass percent of a mixture of ingredients.

In one embodiment, substantially free comprises a substance having 0 to 0.01% by mass percent of a mixture of ingredients.

In one embodiment, substantially free comprises a substance having 0 to 0.001% by mass percent of a mixture of ingredients.

In one embodiment, substantially free comprises a substance having 0 to 0.0001% by mass percent of a mixture of ingredients.

In one embodiment, substantially free comprises a substance having 0 to 0.00001% by mass percent of a mixture of ingredients.

In one embodiment, substantially free comprises a substance having 0 to 0.000001% by mass percent of a mixture of ingredients.

In one embodiment, the food products disclosed herein are unpasteurized.

As used herein, the term "unpasteurized" refers to a food not undergoing pasteurization. Pasteurization is a process of killing microbes within a food substance for prolonging the shelf life of the food substance. In contrast, sterilization is the process of killing all microbes, bacteria, or pathogens in a food product. Pasteurization normally comprises heating a food product to kill microbes and then canning/packaging.

Disclosed herein is a coconut meat extraction device comprising:
 a cylindrical shaft; and
 a toothed scraper;
 wherein the said coconut meat extraction device is a single contiguous unit.

Figure 1:
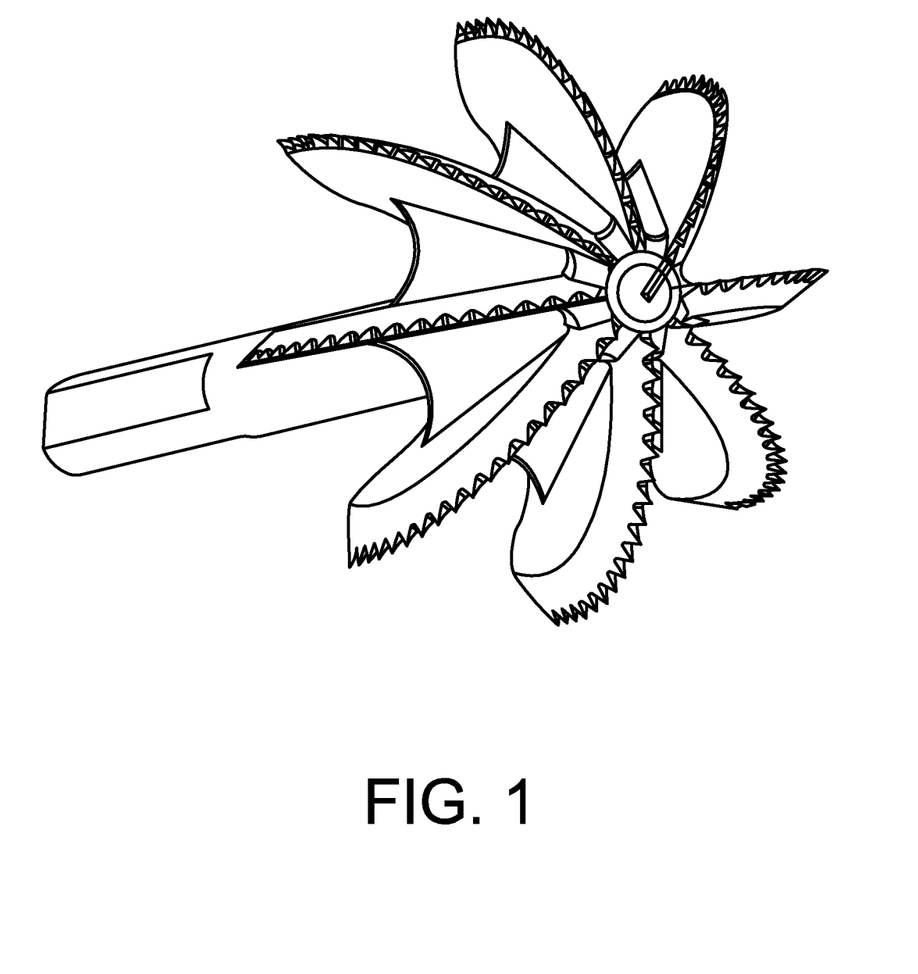
FIG. 1 is an illustrative example of a coconut meat extraction device with a plurality of curved toothed flanges.
Figure 2:
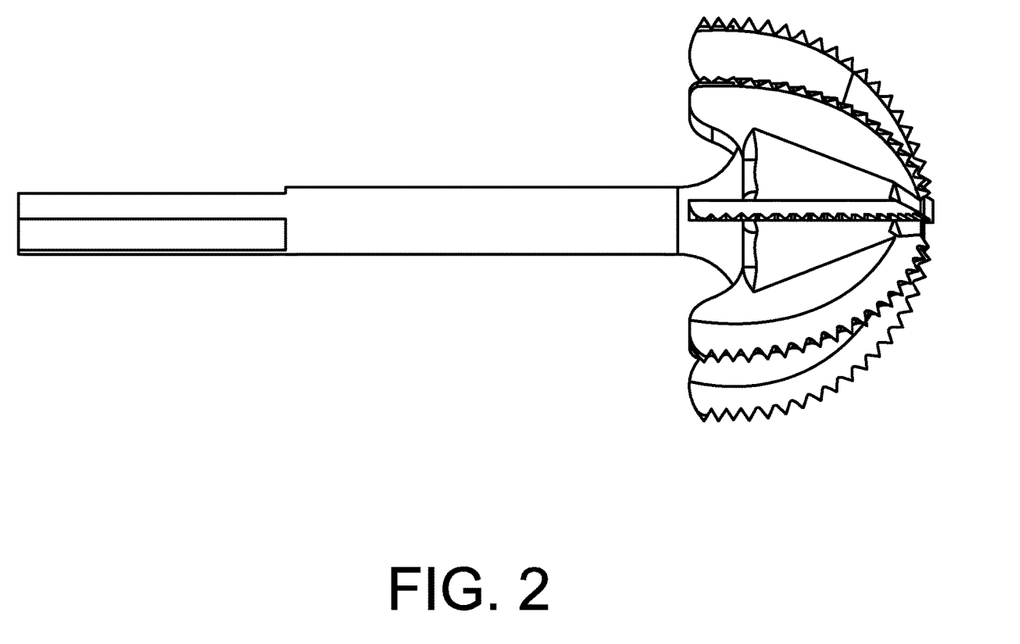
FIG. 2 is an illustrative example of a coconut meat extraction device.

FIG. 1 is an illustrative example of a coconut meat extraction device. FIG. 2 is an example of a coconut meat extraction device from a side view.

As used herein, the term "cylindrical shaft" refers to an elongated element for transmitting power from one part to another, or from a machine producing power to a machine absorbing power. In one embodiment, a cylindrical shaft provides a means for support. In one embodiment, a cylindrical shaft is a transmission shaft. Within the context of this disclosure, a transmission shaft transmits power from a power source to a machine absorbing power. In one embodiment, a cylindrical shaft is a machine shaft. In one embodiment, a machine shaft is a machine element integral to the entire machine. In one embodiment, a cylindrical shaft comprises indentations along the bottom of the cylindrical shaft. In one embodiment, a cylindrical shaft is moved by a device with capable of rotating the cylindrical about the axis of the shaft. In one embodiment, a cylindrical shaft is inserted into the chuck of a drill. In one embodiment, a cylindrical shaft comprises a circular circumference. In one embodiment, a cylindrical shaft comprises a hexagonal shaped circumference. In one embodiment, a cylindrical shaft comprises an octagonal shaped circumference.

Figure 5:
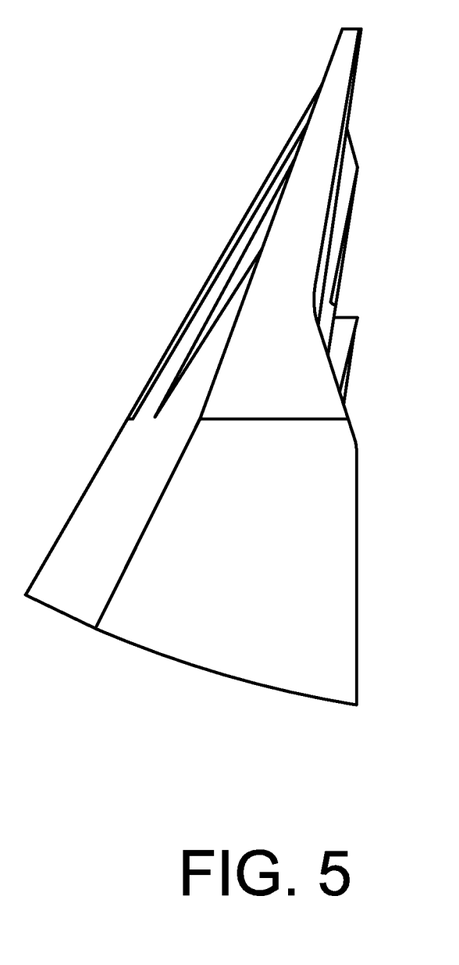
FIG. 5 is an illustrative example of an angled indentation.

As used herein, the term "toothed scraper" refers to a structure with a plurality of angled indentations suitable for removing material by friction, abrasion, mechanical force, etc. In one embodiment, a toothed scraper comprises angled indentations along an outer edge. In one embodiment, a toothed scraper comprises serrated edges. In one embodiment, a toothed scraper comprises a plurality of teeth suitable for producing fine strips of coconut meat. In one embodiment, a toothed scraper comprises a plurality of curved toothed flanges, blades, protrusions, etc. FIG. 5 is an illustrative example of an angled indentation.

Figure 3:
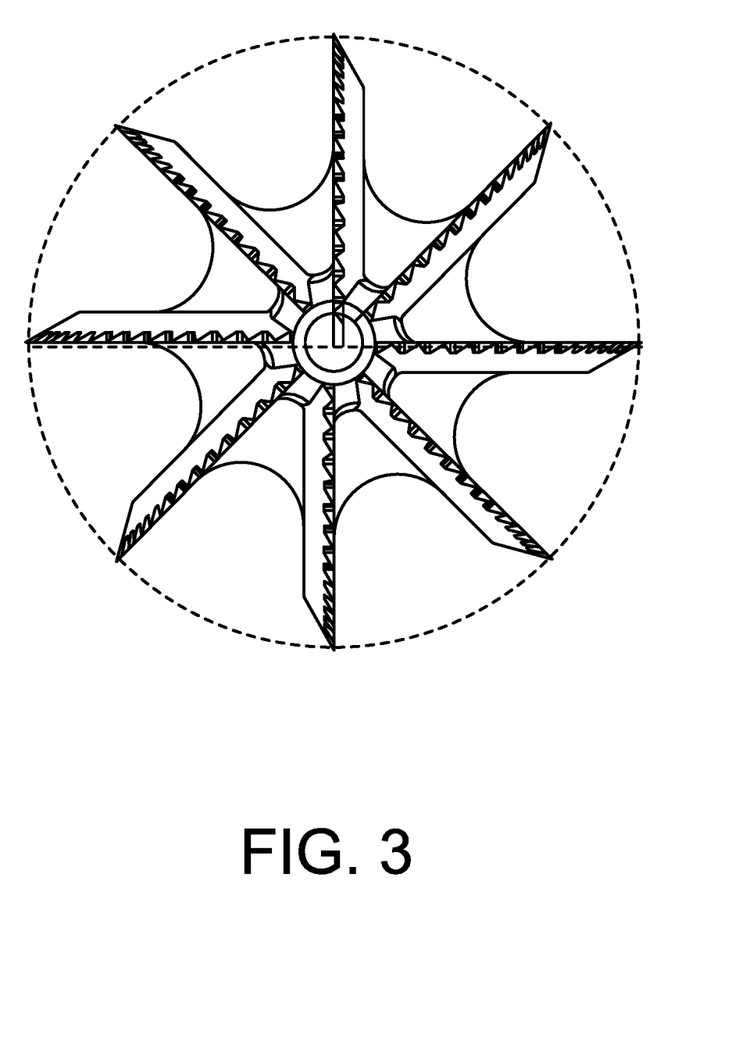
FIG. 3 is an illustrative example of a toothed scraper from a top view showing an example of how the curved toothed flanges rotate in a circle. A dotted circle represents the movement of the curved toothed flanges along the cylindrical shaft.
Figure 4:
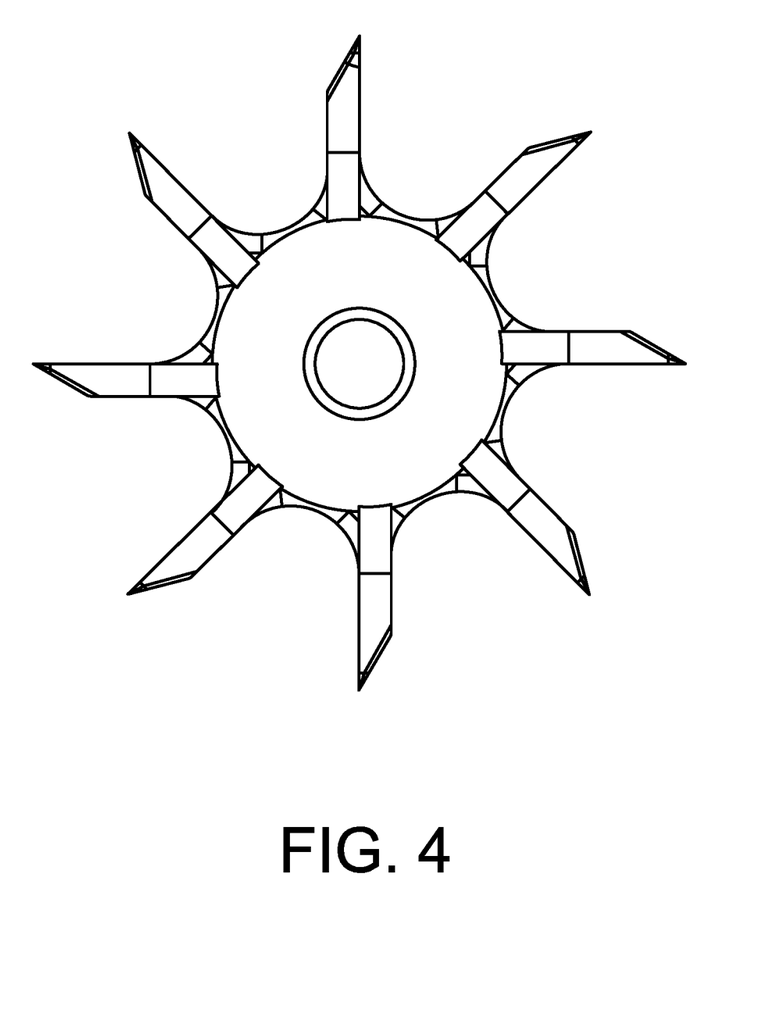
FIG. 4 is an illustrative bottom view of a coconut meat extraction device.

FIG. 3 is an illustrative example of a toothed scraper from a top view showing an example of how the curved toothed flanges rotate in a circle. A dotted circle represents the movement of the curved toothed flanges along the cylindrical shaft. FIG. 4 is an illustrative example of a toothed scraper from a bottom view and how the curved toothed flanges rotate in a circle.

Figure 6:
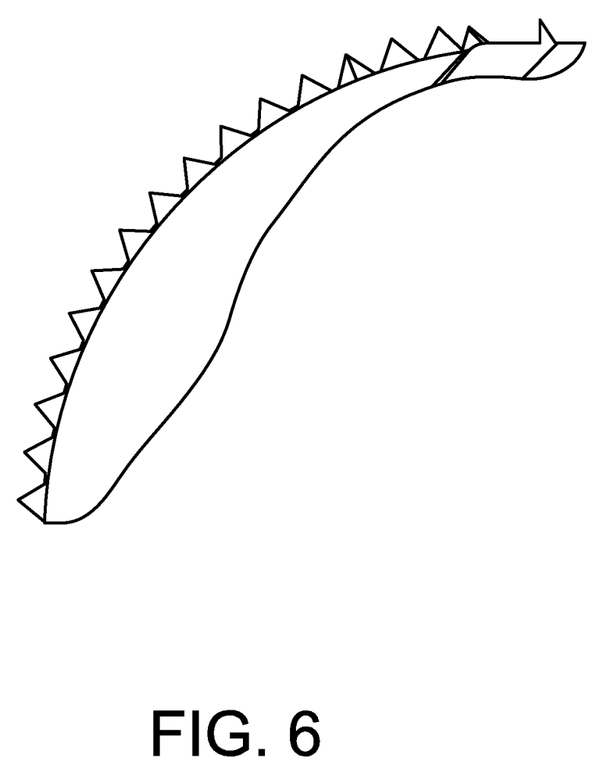
FIG. 6 is an illustrative example of curved flanges.

As used herein, the term "curved toothed flange" refers to an angled ridge, rim, or rib comprising angled indentations of a piece making up the radius coming out of the shaft/axis. In one embodiment, a curved toothed flange comprises an angled indention, or "teeth", along the outer ridge of the toothed scraper. FIG. 6 is an illustrative example of a curved toothed flange. In one embodiment, the edge of a curved toothed flange is at an angle between 0-90 degrees. In one embodiment, the edge of a curved toothed flange is at an angle between 10-80 degrees. In one embodiment, the edge of a curved toothed flange is at an angle between 20-70 degrees. In one embodiment, the edge of a curved toothed flange is at an angle between 30-60 degrees. In one embodiment, the edge of a curved toothed flange is at an angle between 40-50 degrees.

In one embodiment, the coconut meat extraction device comprises 2-20 curved toothed flanges. In one embodiment, the coconut meat extraction device comprises 4-18 curved toothed flanges. In one embodiment, the coconut meat extraction device comprises 6-16 curved toothed flanges. In one embodiment, the coconut meat extraction device comprises 8-14 curved toothed flanges. In one embodiment, the coconut meat extraction device comprises 10-12 curved toothed flanges.

As used herein, the term "single contiguous unit" refers to a device constructed from a single piece of material. Devices manufactured from multiple pieces creates the possibility for a device to break apart, malfunction, collect dirt, etc. A device of a single contiguous unit provides many benefits including durability, performance, cleanliness, and sanitation. A device of a single contiguous unit is also better situated to handle substantial use without breaking or wearing out.

In one embodiment, a coconut meat extraction device is made of stainless steel.

As used herein, the term "stainless steel" refers to an alloy with a minimum chromium content of 10% by mass percent. Within the culinary industry, stainless steel is often used in kitchens and food production since stainless steel does not easily rust or corrode. Stainless steel is also non-reactive and durable. Stainless steel may be composed of different metals and different ratios of metals based on the specific need of the final product. For example, a chromium oxide layer helps prevent surface corrosion by preventing oxygen diffusion into the steel surface and reaching the metal's internal surface. Many different compositions of stainless steel are available. The crystalline structure is one way to differentiate compositions. In one example, the stainless steel is Austenitic, or 200 and 300 series. Austenitic stainless steel has an austenitic crystalline structure, which is a face-centered cubic crystal structure.

In one embodiment, stainless steel is Ferritic. Ferritic stainless steels generally have better engineering properties than austenitic grades, but have reduced corrosion resistance, because of the lower chromium and nickel content.

In one embodiment, stainless steel is Martensitic. Martensitic stainless steel is not as corrosion-resistant as Austenitic and Ferritic but are extremely strong and tough, as well as highly machinable, and can be hardened by heat treatment.

In one embodiment, the stainless steel is Duplex steel. Duplex stainless steel has a mixed microstructure of austenite and ferrite, the aim usually being to produce a 50/50 mix, although in commercial alloys the ratio may be 40/60.

NSF (formerly National Sanitation Foundation) provides certification that products meet public health and safety standards. NSF certification is optional but is highly reputable and many companies opt to meet NSF standards. Some laws require NSF certification or an equivalent standard for sale and/or use.

NSF standards for stainless steel in food equipment is of the type AISI 200 series, AISI 300 series, or AISI 400 series and have a minimum 16% chromium content unless the use is for cutlery, blades, or similar applications requiring a sharp edge.

As used herein, the term "AISI x00" refers to a standardized numbering for grades of steel. Similar references may also refer to SAE. In one example, the same piece of stainless steel may be referred to as 304, AISI, 304, and SAE 304. All labeling is acceptable and understood to refer to the same grading of steel.

In one embodiment, the stainless steel is 304-stainless steel. As used herein, the term "304-stainless steel" refers to stainless steel normally comprising 18% chromium and 8% nickel by mass percent. This specific ratio is sometimes called 18/8 stainless steel.

Disclosed herein is a coconut shredding device, comprising a coconut meat extraction device of:
a cylindrical shaft; and
a toothed scraper;
wherein the said coconut meat extraction device is a single contiguous unit; and a means for rotating the cylindrical shaft of the coconut meat extraction device about the axis of the said shaft.

As used herein, the term "a means for rotating" refers to a source providing power for enabling a cylindrical shaft to spin the toothed scraped about the axis of the shaft. In one embodiment, a means for rotating comprises a power drill, e.g., placing a cylindrical shaft into the chuck of a power drill. In one embodiment, a means for rotating comprises a motor. In one embodiment, the motor is connected to a power source. In one embodiment, a power source is a battery. In one embodiment, a power source is electricity. In one embodiment, a power source is a hand crank. In one embodiment, a hand crank is operated by a human.

As used herein, the term "about the axis" refers to an object, e.g., a toothed scraper, rotating along its vertical orientation. In one embodiment, rotating about the axis comprises an object maintaining radial symmetry. Within the context of this disclosure, radial symmetry refers to when an object looks the same after some, consistent rotations by partial turns. In one example, a square rotated 90 degrees along its axis appears the same after each turn. In one example, a circle appears the same after any turn. In one embodiment, a curved toothed flange is aligned to pass through the axis of a cylindrical shaft.

Although the disclosed invention has been described with reference to various exemplary embodiments, it is to be understood that these embodiments are merely illustrative of the principles and applications of the present invention. Those having skill in the art would recognize that various modifications to the exemplary embodiments may be made, without departing from the scope of the invention.

Moreover, it should be understood that various features and/or characteristics of differing embodiments herein may be combined with one another. It is therefore to be understood that numerous modifications may be made to the illustrative embodiments and that other arrangements may be devised without departing from the scope of the invention. Furthermore, other embodiments of the invention will be apparent to those skilled in the art from consideration of the specification and practice of the invention disclosed herein. It is intended that the specification and examples be considered as exemplary only, with a scope and spirit being indicated by the claims.

Finally, it is noted that, as used in this specification and the appended claims, the singular forms "a," "an," and "the," include plural referents unless expressly and unequivocally limited to one referent, and vice versa. As used herein, the term "include" or "comprising" and its grammatical variants are intended to be non-limiting, such that recitation of an item or items is not to the exclusion of other like items that can be substituted or added to the recited item(s).

What is claimed is:
1. A coconut meat extraction device comprising:
a cylindrical shaft; and a toothed scraper including a plurality of curved toothed flanges which are radially spaced, and each of the curved tooth flanges is angled between 10 and 80 degrees in a same direction, wherein the curved tooth flanges provide a smooth operation when rotating in one direction and a rough operation when rotating in another direction, and wherein said coconut meat extraction device is a single contiguous unit.

2. The device of claim 1, wherein the said coconut meat extraction device is made from stainless steel.

3. The device of claim 2, wherein the stainless steel is chosen from one of 200 series, AISI 300 series, or AISI 400 series stainless steel, wherein the stainless steel comprises 16% minimum chromium content by weight.

4. The device of claim 3, wherein the stainless steel is AISI 300 series.

5. The device of claim 4, wherein the stainless steel is 304-stainless steel.

6. The device of claim 1, wherein the toothed scraper comprises a plurality of radial guides between each of the curved toothed flanges to prevent the coconut meat from escaping between the curved toothed flanges.

7. A coconut shredding device, comprising the coconut meat extraction device of claim 1 and a means for rotating the cylindrical shaft of the coconut meat extraction device about the axis of the said shaft.

* * * * *